United States Patent
Barwicz et al.

(10) Patent No.: US 8,545,108 B1
(45) Date of Patent: Oct. 1, 2013

(54) FLEXIBLE FIBER TO WAFER INTERFACE

(75) Inventors: Tymon Barwicz, Yorktown Heights, NY (US); Hidetoshi Numata, Sagamihara (JP); Yoichi Taira, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/453,027

(22) Filed: Apr. 23, 2012

Related U.S. Application Data

(63) Continuation of application No. 13/428,277, filed on Mar. 23, 2012.

(51) Int. Cl.
*G02B 6/38* (2006.01)

(52) U.S. Cl.
USPC .............................................. 385/60; 385/14

(58) Field of Classification Search
USPC ..................................................... 385/60, 14
See application file for complete search history.

(56) References Cited

U.S. PATENT DOCUMENTS

| | | | |
|---|---|---|---|
| 5,343,544 A | 8/1994 | Boyd et al. | |
| 5,375,184 A | 12/1994 | Sullivan | |
| 5,499,312 A | 3/1996 | Hahn et al. | |
| 6,097,871 A | 8/2000 | De Dobbelaere et al. | |
| 6,157,759 A | 12/2000 | Seo et al. | |
| 6,415,082 B1 * | 7/2002 | Wach | 385/39 |
| 6,470,117 B1 | 10/2002 | Tang et al. | |
| 6,631,228 B2 | 10/2003 | Gao et al. | |
| 6,709,607 B2 | 3/2004 | Hibbs-Brenner et al. | |
| 6,860,642 B2 | 3/2005 | Vodrahalli et al. | |
| 6,976,792 B1 | 12/2005 | Cohen et al. | |
| 7,058,275 B2 | 6/2006 | Sezerman et al. | |
| 7,223,025 B2 | 5/2007 | Benzoni et al. | |
| 7,454,098 B1 * | 11/2008 | Lamprecht et al. | 385/14 |
| 7,492,995 B2 | 2/2009 | Kuroda et al. | |
| 7,729,581 B2 | 6/2010 | Rolston et al. | |

(Continued)

FOREIGN PATENT DOCUMENTS

| | | |
|---|---|---|
| CN | 101702048 A | 5/2010 |
| CN | 102084277 A | 6/2011 |

(Continued)

OTHER PUBLICATIONS

A. Kumar et al, "Birefringence of optical fiber pressed into a V groove," Optics Letters, Dec. 1981, vol. 6, Issue 12, 1981, pp. 644-646.

(Continued)

*Primary Examiner* — Charlie Peng
*Assistant Examiner* — Peter Radkowski
(74) *Attorney, Agent, or Firm* — Cantor Colburn LLP; Vazken Alexanian

(57) ABSTRACT

A fiber to wafer interface system includes an interface device comprising a flexible substrate portion, a flexible cladding portion arranged on the substrate portion, a flexible single-mode waveguide portion arranged on the cladding portion including a substantially optically transparent material, a connector portion engaging a first distal end of the flexible substrate portion, the connector portion operative to engage a portion of an optical fiber ferrule, a wafer portion comprising a single mode waveguide portion arranged on a portion of the wafer, an adhesive disposed between a portion of the single mode waveguide portion of the body portion and the single mode waveguide portion of the wafer portion, the adhesive securing the body portion to the wafer portion.

14 Claims, 8 Drawing Sheets

(56) References Cited

U.S. PATENT DOCUMENTS

| | | | |
|---|---|---|---|
| 7,738,753 | B2 | 6/2010 | Assefa et al. |
| 2002/0106165 | A1* | 8/2002 | Arsenault et al. ............... 385/89 |
| 2002/0181882 | A1* | 12/2002 | Hibbs-Brenner et al. ...... 385/52 |
| 2004/0022487 | A1* | 2/2004 | Nagasaka et al. ............... 385/31 |
| 2004/0028314 | A1* | 2/2004 | Lee et al. ......................... 385/14 |
| 2005/0163416 | A1* | 7/2005 | Yamada et al. .................. 385/14 |
| 2008/0075408 | A1* | 3/2008 | Cho et al. ......................... 385/89 |
| 2008/0253423 | A1 | 10/2008 | Kopp |
| 2009/0110354 | A1* | 4/2009 | Sutherland ....................... 385/50 |
| 2009/0226130 | A1 | 9/2009 | Doany et al. |
| 2010/0061683 | A1 | 3/2010 | Sasaki |
| 2012/0020621 | A1 | 1/2012 | Zhou |
| 2012/0207426 | A1 | 8/2012 | Doany et al. |

FOREIGN PATENT DOCUMENTS

| | | |
|---|---|---|
| JP | 5063419 A | 3/1993 |
| JP | 2005189730 A | 7/2005 |
| JP | 2007333982 A | 12/2007 |
| JP | 2012137538 A | 7/2012 |
| KR | 20090001169 U | 2/2009 |

OTHER PUBLICATIONS

B. G. Lee et al., "20-um-pitch eight-channel monolithic fiber array coupling 160 Gb/s/channel to silicon nanophotonic chip," 2010 Conference on Optical Fiber Communication (OFC), collocated National Fiber Optic Engineers Conference, (OFC/NFOEC), Mar. 21-25, 2010, paper PDPA4, 3 pages.

Oz Optics, "V-Groove Assemblies," Datasheet DTS0083, Mar. 19, 2009, http://www.ozoptics.com/ALLNEW_PDF/DTS0083.pdf, downloaded Aug. 3, 2011.

Barwicz, et al., "Fiber to Wafer Interface," U.S. Appl. No. 13/331,164, filed Dec. 12, 2011; not yet published.

Barwicz et al. "Flexible Fiber to Wafer Itnerface," U.S. Appl. No. 13/428,277, filed Mar. 23, 2012, not yet published.

Booth et al., "Polyguide(tm) Polymeric Technology for Optical Interconnect Circuits and Components," Proc. SPIE, vol. 3005, 1997, pp. 238-251.

Lee et al., "20-um-Pitch Eight-Channel Monolithic Fiber Array Coupling 160 Gb/s/Channel to Silicon Nanophotonic Chip," 2010 Conference on Optical Fiber Communication (OFC), collocated National Fiber Optic Engineers Conference, (OFC/NFOEC), Mar. 21-25, 2010, paper PDPA4, 3 pages.

Thacker et al., "Flip-Chip Integrated Silicon Photonic Bridge Chips for Sub-Picojoule Per Bit Optical Links", Proceedings 60th Electronic Compoennts and Technology Conference (ECTC), Jun. 1-4, 2010, pp. 240-243.

Wang et al., "Ge-photodetectors for Si-Based Optelectronic Integration", Sensors, vol. 11, No. 1, 2011, pp. 696-718.

* cited by examiner

FLEXIBLE FIBER TO WAFER INTERFACE

CROSS REFERENCE TO RELATED APPLICATIONS

This is a continuation application of application Ser. No. 13/428,277, filed Mar. 23, 2012.

FIELD OF INVENTION

The present invention relates generally to optical signal connection devices, and more specifically, to interfaces between optical fibers and devices arranged on wafers.

DESCRIPTION OF RELATED ART

Optical signals may be transmitted via optical fibers. It is often desirable to connect the optical fibers to devices such as, for example, wave guides or signal processing features that may be arranged on a wafer such as, for example, a semiconductive wafer. Previous methods and devices for connecting optical devices to devices on wafers are often inefficient and costly to manufacture.

BRIEF SUMMARY

According to one embodiment of the present invention, a fiber to wafer interface system includes an interface device comprising a flexible substrate portion, a flexible cladding portion arranged on the substrate portion, a flexible single-mode waveguide portion arranged on the cladding portion including a substantially optically transparent material, a connector portion engaging a first distal end of the flexible substrate portion, the connector portion operative to engage a portion of an optical fiber ferrule, a wafer portion comprising a single mode waveguide portion arranged on a portion of the wafer, an adhesive disposed between a portion of the single mode waveguide portion of the body portion and the single mode waveguide portion of the wafer portion, the adhesive securing the body portion to the wafer portion.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 illustrates a flexible substrate;

FIG. 8 illustrates a lower cladding layer;

FIG. 9 illustrates a core material layer;

FIG. 10 illustrates the formation of the waveguide portion;

FIG. 11 illustrates the formation of an upper cladding layer;

FIG. 12 illustrates the resultant structure following a photolithographic patterning process; and FIG. 13 illustrates the resultant structure following a photolithographic patterning process.

DETAILED DESCRIPTION

Previous interfaces between optical fiber and devices arranged on wafers were costly to manufacture. The methods and devices described below offer an economic interface for connecting optical fiber to devices arranged on wafers. In this regard, a wafer may include any type of substrate having a substantially planar surface. The wafer may include any type of suitable material or combination of materials including, for example, silicon (Si), germanium (Ge), gallium (Ga), arsenic (As), indium (In), or phosphorous (P). Any type of devices or combinations of devices may be fabricated on a wafer such as, for example, optical features, optical wave guides, mechanical features, or electronic features.

Figure 1:
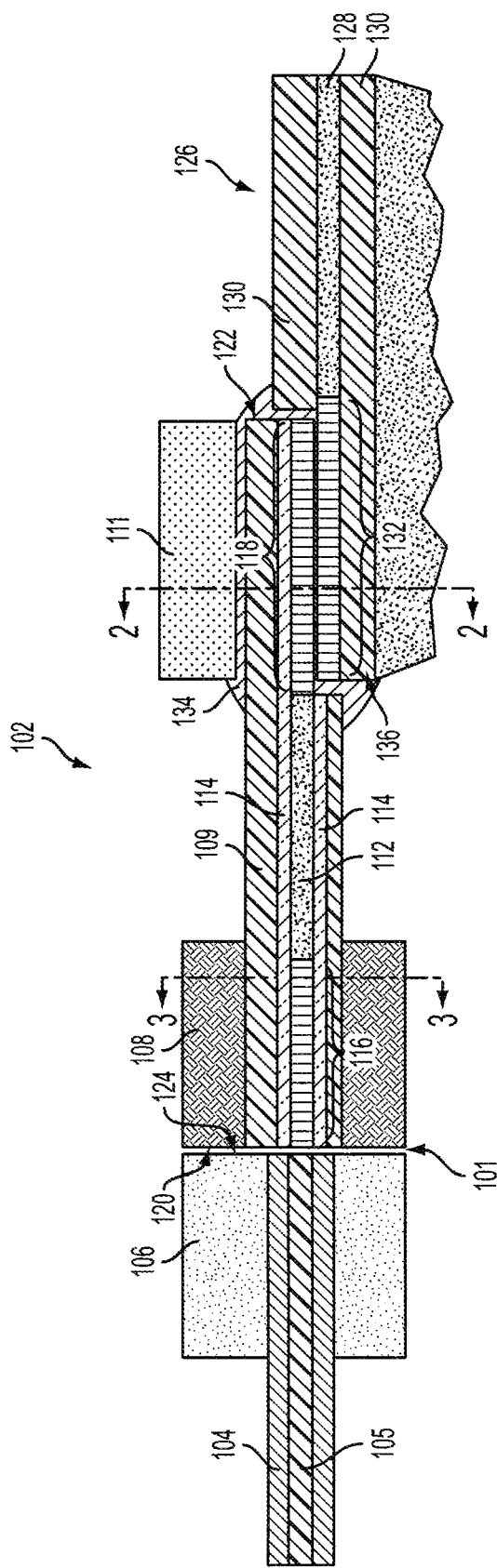
FIG. 1 illustrates a side cut-away view of an exemplary embodiment of a flexible interface device.

FIG. 1 illustrates a side cut-away view of an exemplary embodiment of a flexible interface device 102. The interface device 102 is secured proximate to optical fiber(s) 104 that is arranged in an optical fiber ferrule 106. The optical fiber ferrule 106 is operative to secure at least one optical fiber 104, and in the illustrated embodiment, the optical fiber ferrule 106 secures a plurality of optical fibers 104. The optical fibers 104 of the illustrated embodiment may be formed from, for example doped silica glass and/or polymer material. The optical fibers may be cylindrical in shape and are designed to guide single-mode optical signals. In the illustrated embodiment, the diameter of the optical fibers 104 is between approximately 40 to 130 microns (μm), or 80, 90, or 125 μm. The core 105 of the optical fiber has a diameter between 2 and 15 μm, or between 8 and 11 μm. The optical fiber ferrule 106 secures the optical fibers 104 in an arrangement where the optical fibers 104 are spaced approximately between 100 and 500 μm between each other, or approximately 250 μm in a substantially coplanar arrangement at the distal end 101 of the optical fiber ferrule 106.

The optical fiber ferrule 106 may be aligned and secured to the interface device 102 with, for example, an arrangement of pins, fasteners, or clips (described below). An example of an optical fiber ferrule is an MT ferrule using metal guide pins. The ferrule may contain between 1 and 48 fibers, or 8 or 12 fibers. The interface device 102 of the illustrated embodiment includes a rigid or semi-rigid connector portion 108, a flexible substrate portion 109 and a waveguide portion 112 arranged on the flexible substrate portion 109. The connector portion 108 is operative to mechanically connect to the optical fiber ferrule 106 with the arrangement of pins, fasteners, or clips, and aligns the waveguide portion 112 with the optical fiber 104 arranged in the optical fiber ferrule 106.

The flexible substrate portion 109 may include, for example, a polyimide, polysilane, polynorbornene, polyethylene, epoxy, acrylic resin, or a fluorinated derivative of a resin material. The flexible substrate portion 109 of the illustrated embodiment is substantially transparent for wavelengths between approximately 350 and 400 nm. The flexible substrate portion is approximately 15 to 1000 μm thick, 0.1-50 mm wide, and 0.1 to 500 mm long. The flexible substrate portion 109 may define cladding portions of the waveguide assembly.

The waveguide portion 112 is formed on the flexible substrate portion 109 using spin-on deposition and photolithographic methods. The waveguide portion 112 may be formed from a polymer material and is surrounded by a cladding portion(s) described below. The cladding portion 114 is substantially transparent to the optical signals. The optical loss through the cladding portion 114 material is less than 20 decibels per centimeter (dB/cm), or less than approximately 5 dB/cm or 3 dB/cm for the wavelength range of the optical signals (for example, between 950 and 1650 nanometers (nm), or for a 60 nm wide wavelength spectrum located between 950 and 1650 nanometers (nm)). The waveguide portion 112 is a single-mode waveguide having rectangular, rib, ridge, strip, or wire geometry having a width between approximately 100 nm to 30 μm, and a height between approximately 100 nm to 15 μm. The waveguide portion 112 is formed from a substantially transparent material such as, for example, a polymer material having a propagation loss that is less than 10 dB/cm, or less than approximately 2 dB/cm for the wavelength range of the optical signals (350-2500 nm, or 800-1650 nm, or 1280-1600 nm, or for a 60 nm wide wavelength spectrum, located between 950 and 1650 nanometers (nm)). The waveguide portion 112 is, for example, approximately 0.5 to 20 μm wide, 0.5 to 15 μm high, and spaced 5 to 500 μm. The refractive index is, for example, between approximately 1.30 to 1.65 and the index contrast is, for example, between approximately 0.1 to 10%.

In the illustrated embodiment, the waveguide portion 112 includes a first optical mode converter portion 116 and a second optical mode converter portion 118 arranged at a first distal end 120 and a second distal end 122, respectively, of the waveguide portion 112. In one embodiment, the thickness of the cladding region 114 separating the waveguide 112 from the adhesive 134 may be reduced near 118 to be between 0 and 5 μm, or between 0 and 1 μm.

In the illustrated embodiment, the first optical mode converter portion 116 is sized and shaped to provide a butt-coupling arrangement between the distal ends 124 of the optical fiber(s) 104 and the first distal end 120 of the waveguide portion 112 that matches the mode profile(s) of the optical fiber(s) 104. The interface between the illustrated fiber and the mode converter 116 is perpendicular to the axis of the fiber. Alternatively, the interface may be tilted at an angle less than 90 degrees to reduce the light reflections at the interface. The angle may be between 75 and 90 degrees, or 82 degrees to reduce reflections. The fiber axis corresponds to the waveguide axis but the interface between the fiber and the waveguide may be normal or arranged at an oblique angle to the fiber and waveguide axis.

The interface device 102 is secured to the wafer 126 with an adhesive 134. The wafer 126 of the illustrated embodiment includes a single-mode waveguide portion 128 arranged on the wafer 126. The waveguide portion 128 may include any number of waveguides having, for example, a rectangular, rib, ridge, strip, or wire geometry. The waveguide portion 128 includes a substantially transparent material such as, for example, Si, SiC, SiGe, SiON, $SiO_2$, SiCN, GaAs, InP, InGaAsP, or GaN. The width of the waveguides in the waveguide portion 128 is approximately 0.05 μm-15 μm, while the height of the waveguides in the waveguide portion is approximately 0.01 μm-10 μm. The propagation loss of the material is less than 20 dB/cm for the wavelength range of the optical signals or less than 3 dB/cm for a 60 nm wide wavelength spectrum located between 950 and 1650 nanometers (nm)). The refractive index is between 1.3 to 4.5, and the spacing of the waveguide is approximately 5-500 μm. The waveguide portion 128 is surrounded by cladding portion(s) 130 that is substantially transparent to the optical signals. The cladding portion 130 may be formed from a material such as, for example, Si, SiC, SiGe, SiON, $SiO_2$, SiCN, GaAs, InP, InGaAsP, or GaN. In the illustrated embodiment the cladding portions 130 have a thickness of approximately 1-15 μm. The waveguide portion 128 includes an optical mode converter portion 132. In one embodiment, the thickness of the cladding region 130 separating the waveguide 128 from the adhesive 134 may be reduced near the optical mode converter portion 132 to be between 0 and 5 μm, or between 0 and 1 μm.

In the illustrated embodiment, the adhesive 134 includes, for example, an optically transparent epoxy that may be applied as a liquid and cured with an ultra violet light; however any suitable adhesive may be used to secure the interface device 102 to the wafer 126. The adhesive 134 provides an optical loss for a plane wave propagating through the material of less than 30 dB/cm or less than 10 dB/cm or 5 dB/cm for the wavelength range of the optical signals (for a 60 nm wide wavelength spectrum located between 950 and 1650 nanometers (nm)). The optical mode converter portion 118 of the interface device 102 overlaps with, and is aligned and arranged proximate to the optical mode converter portion 132 arranged on the wafer 126. In the illustrated embodiment, the waveguide portions 112 and 128 are arranged to provide adiabatic coupling in the optical mode converter portions 118 and 132 and include corresponding tapered profiles (e.g., the width of the optical mode converter portion 118 portion tapers towards the distal end 122 while the width of the optical mode converter portion 132 may taper towards the edge 136 of the wafer 126). In this regard one of the two waveguide portion 112 and 128 may include the tapered profile, while the corresponding waveguide portion may not include a tapered profile. For example, the optical mode converter portion 132 arranged on the wafer 126 may include a tapered profile while the optical mode converter portion 118 of the interface device 102 may not include a tapered profile. In an alternate exemplary embodiment, the waveguide portions 112 and 128 may be arranged to provide butt-coupling where the optical mode converter portion 118 on the interface device 102 matches the mode profile of the optical mode converter portion 132 on the wafer 126.

Exemplary embodiments of the interface device 102 may include a cap portion 111 arranged proximate to the distal end 122 and secured to the interface device 102 with the adhesive 134. The cap portion 111 is fabricated from a material that is substantially transparent to ultraviolet wavelengths to allow an ultraviolet light (350-400 nm) to be used to cure the adhesive 134 during fabrication.

Figure 2:
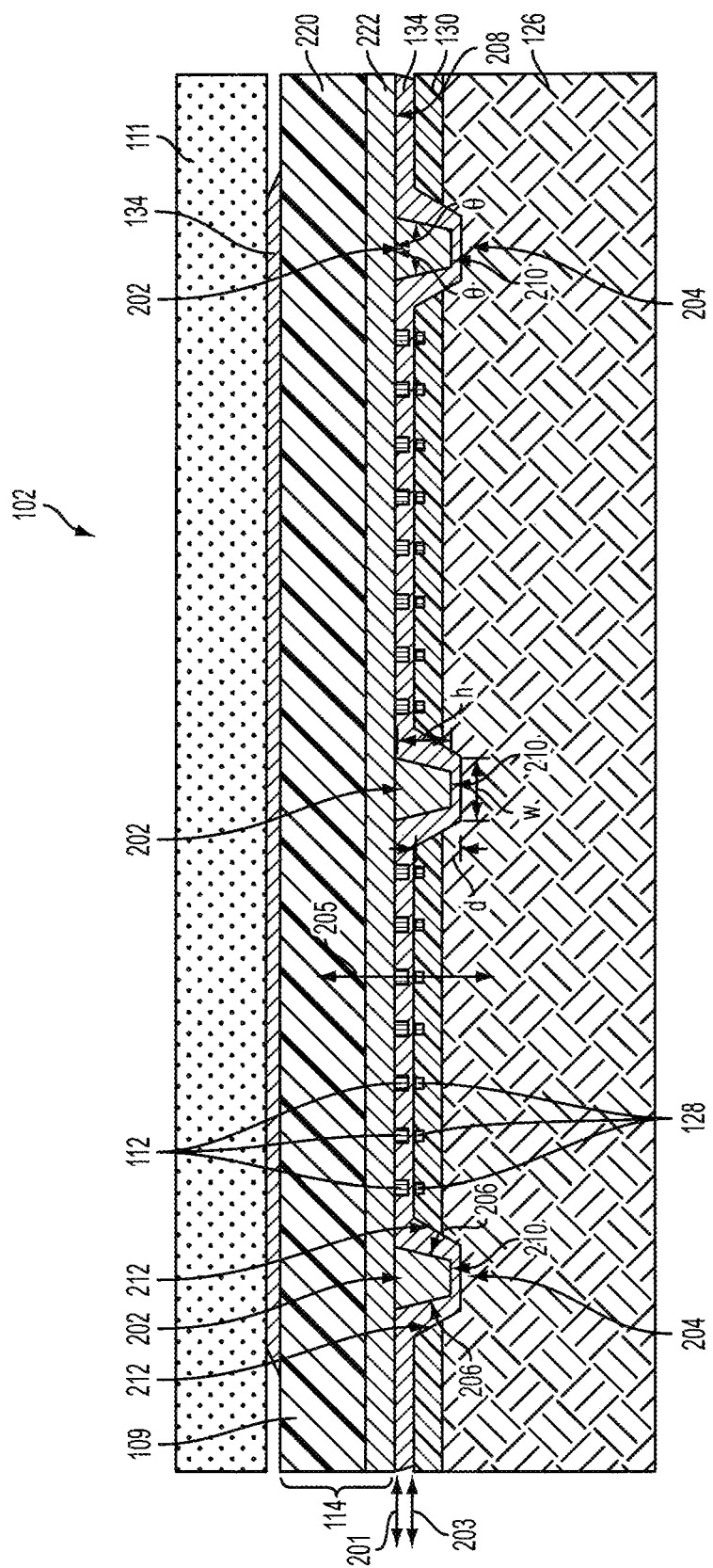
FIG. 2 illustrates a cut-away view along the line 2 of FIG. 1.

FIG. 2 illustrates a cut-away view along the line 2 (of FIG. 1). The arrangement of the overlapping waveguide portions 112 and 128 is shown where the waveguide portions 112 and 128 are arranged in pairs. The longitudinal axes of the waveguide portions 112 are arranged substantially in parallel and coplanar to each other, while the longitudinal axes of the waveguide portions 128 are also arranged substantially in parallel and coplanar to each other. The plane 201 defined by the longitudinal axes of the waveguide portions 112 and the plane 203 defined by the longitudinal axes of the waveguide portions 128 are arranged substantially in parallel to each other. Each of the waveguide portions 112 and 128 in a pair are aligned such that their longitudinal axes are substantially coplanar, defining a plane 205 substantially perpendicular to the planes 201 and 203.

In the illustrated embodiment, engagement features 202 are arranged on the substrate portion 109. The wafer 126 includes corresponding engagement features 204 that may include, for example, recesses or channels that are engaged by the engagement features 202. The channels 204 may be defined by the wafer 126 and/or the cladding portion 130. In the illustrated embodiment, the engagement features 202 extend from the planar surface 208 of the substrate portion 109, and include sloped sidewalls 206 that define an oblique angle (θ) that may range from approximately 30° to 80° relative to the substantially planar surface 208 of the substrate portion 109. Though the sidewalls 206 of the illustrated embodiment define an oblique angle, in alternate embodiments, the sidewalls 206 may define, for example, a substantially right angle. In some embodiments one of the sidewalls 206 may define a substantially right angle, while the opposing sidewall 206 may define an oblique angle. The surface 210 of the engagement features 202 and the surface 208 define a height (h) of approximately 5-100 μm, while the depth (d) of the channels 204 ranges from approximately 1-100 μm, or 10-30 μm. The width (w) of the channels 204 is approximately 5-1000 μm, or 100-500 μm, or 150-300 μm. The arrangement of the engagement features 202 and the corresponding channels 204 provides for precise alignment of the substrate portion 109 with the wafer 126 such that the waveguide portions 112 and 128 are arranged and substantially aligned as discussed above. The sloped sidewalls 206 of the engagement features 202 and the corresponding sloped sidewalls 212 of the channels 204 allow the substrate portion 109 to be more easily aligned with the wafer 126. The adhesive 134 disposed between the wafer 126 and the substrate portion 109 secures the interface device 102 and the wafer 126 together. Though the illustrated embodiment includes the adhesive 134 arranged between the engagement features 202 and the adhesive may be applied in other areas along planar surface 208. Though the illustrated exemplary embodiment includes three engagement features 202, alternate embodiments may include any number of engagement features 202.

In the illustrated embodiment, the substrate portion 109 includes a flexible substrate layer 220 and a lower cladding layer 222. The flexible substrate layer 220 and the lower cladding layer 222 may be formed from similar, the same, or different materials. The engagement features 202 may be formed from the same material as the lower cladding layer 222; however, the engagement features 202 may alternatively be formed from other materials disposed on the lower cladding layer 222.

Figure 3:
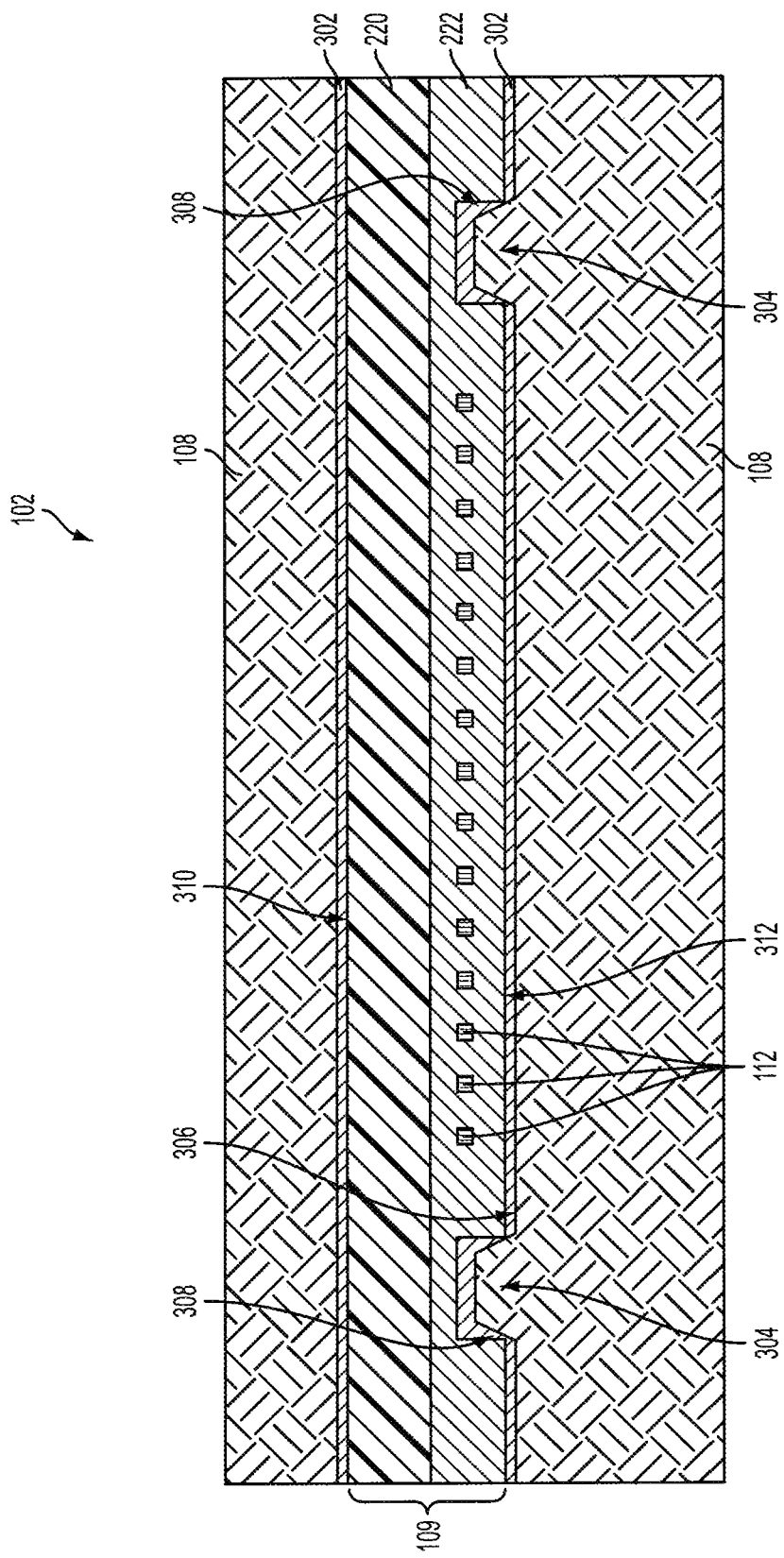
FIG. 3 illustrates a cut-away view along the line 3 of FIG. 1.

FIG. 3 illustrates a cut-away view along the line 3 (of FIG. 1). The connector portion 108 is aligned with the substrate portion 109 with engagement features 304 that extend from the planar surface 306 of the connector portion 108 and engage corresponding engagement features 308 arranged on the substrate portion 109. An adhesive 302 may be arranged between the surfaces 310 and 312 of the substrate portion 109 and is operative to secure the substrate portion 109 to the connector portion 108. The connector portion 108 may be formed from a material that is substantially transparent to ultraviolet light to provide for the curing of the adhesive 302 with ultraviolet light in some embodiments. Though the illustrated embodiment include engagement features 304 that extend from the connector portion 108, alternate embodiments may include engagement features that extend from the substrate portion 109 and engage corresponding recesses in the connector portion 108. The connector portion 108 may be formed from one or more components that may be secured to each other following the arrangement and alignment of the substrate portion 109 with the connector portion. Using for example, an adhesive, vibration, welding, or other similar bonding process.

Figure 4:
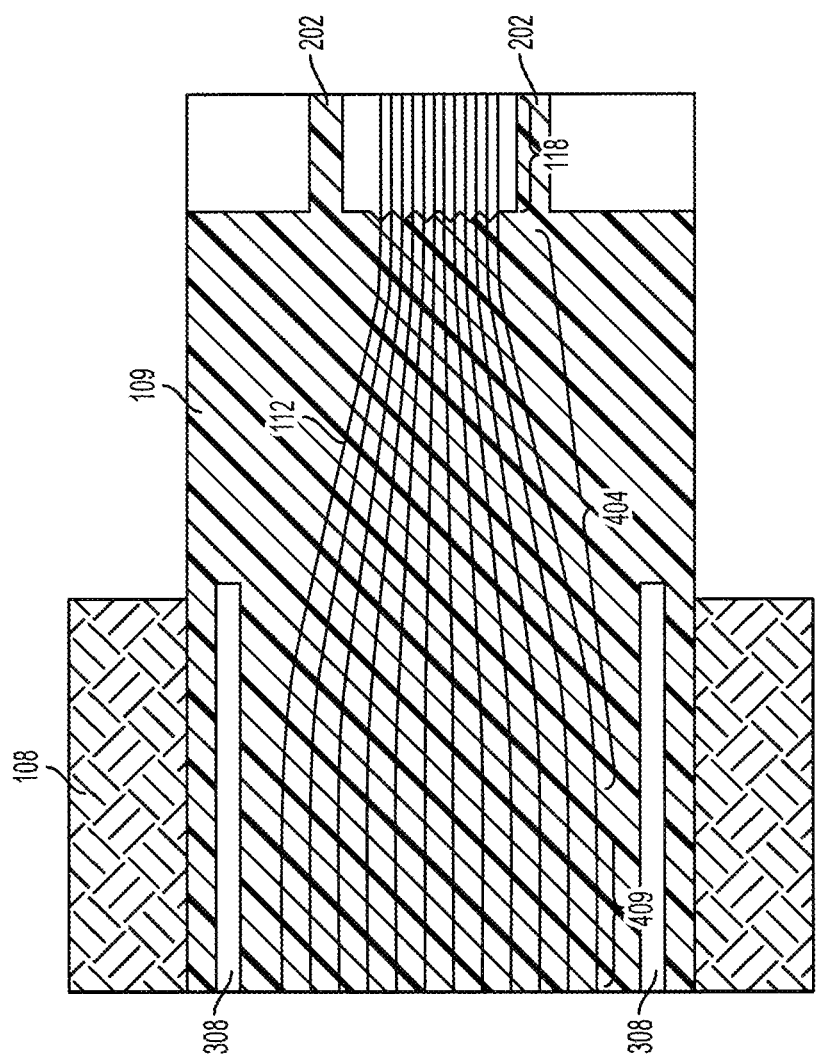
FIG. 4 illustrates a partially cut-away view of a portion of the connector portion and an exemplary embodiment of the substrate portion.

FIG. 4 illustrates a partially cut-away view of a portion of the connector portion 108 and an exemplary embodiment of the substrate portion 109. In the illustrated embodiment, a region 404 changes the pitch of the waveguide portions 112; however, alternate embodiments may include a region 404 that, for example, does not include a change in pitch. The pitch of the waveguide in region 409 may be different than the pitch in the region 118. The pitch of waveguides in region 409 corresponds to the arrangement of the optical fibers 104 in the ferrule 106 (of FIG. 1), and hence may be between 100 and 500 μm, or 250 μm. The pitch near 118 corresponds to the pitch of the waveguides on the wafer in region 132 and may be between 10 and 500 μm, or 50 μm. In one embodiment, mechanical connection of the connector portion with the ferrule 106 provides precise relation (within 2 microns or within 1 micron) to the waveguide portions 112 (and the cladding portions 114) on the substrate portion 109. Correspondingly, alignment pins (not shown) on the optical fiber ferrule 106 are disposed in a precise relation to the optical fibers 104 (within 1 micron). Hence, the optical fibers 104 are precisely located relative to the waveguide portion 112 through the alignment pins and the corresponding alignment features of the connector portion 108.

Figure 5:
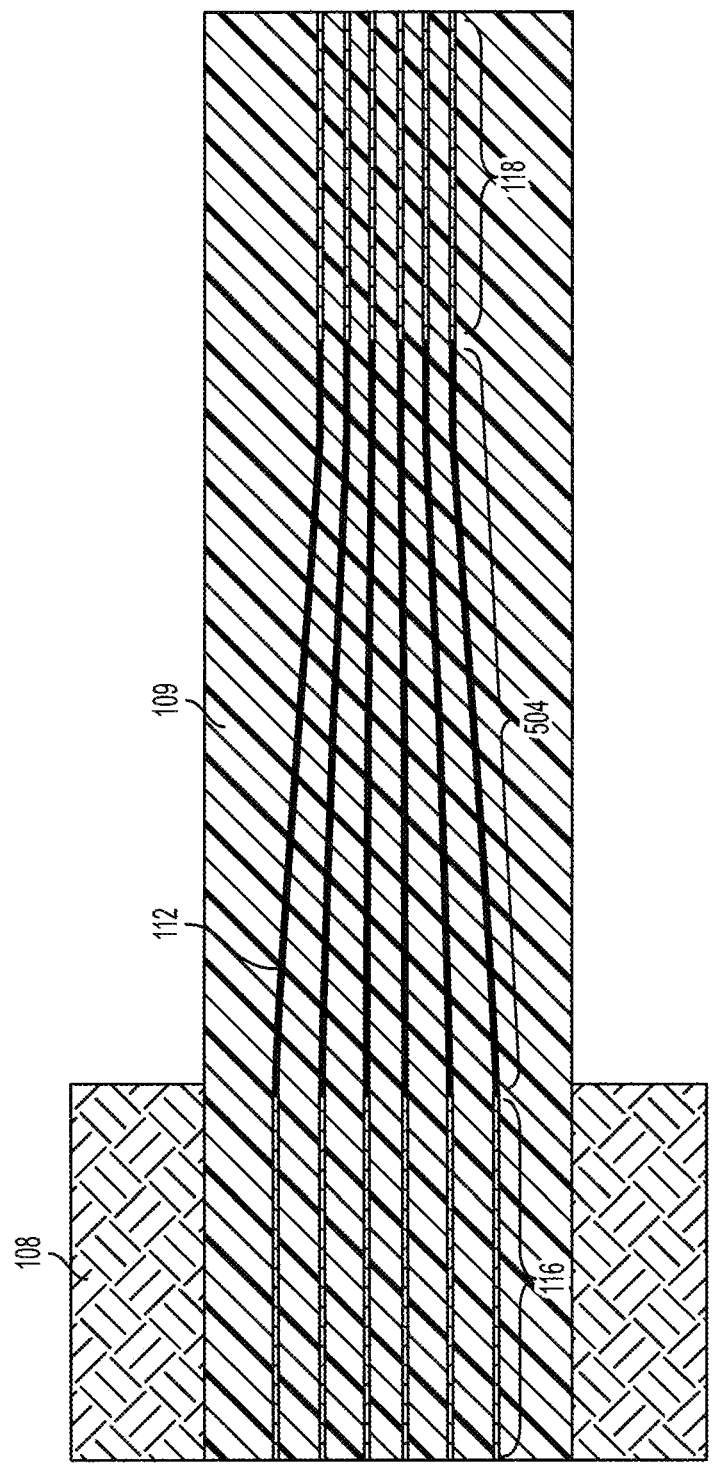
FIG. 5 illustrates a partially cut-away view of a portion of the connector portion 108 and an exemplary embodiment of the substrate portion.

FIG. 5 illustrates a partially cut-away view of a portion of the connector portion 108 and an exemplary embodiment of the substrate portion 109. In the illustrated embodiment, a region 504 changes the pitch of the waveguide portions 112; however, alternate embodiments may include a region 504 that, for example, does not include a change in pitch. The pitch of the waveguide in region 409 may be different than the pitch in the region 118.

Figure 6:
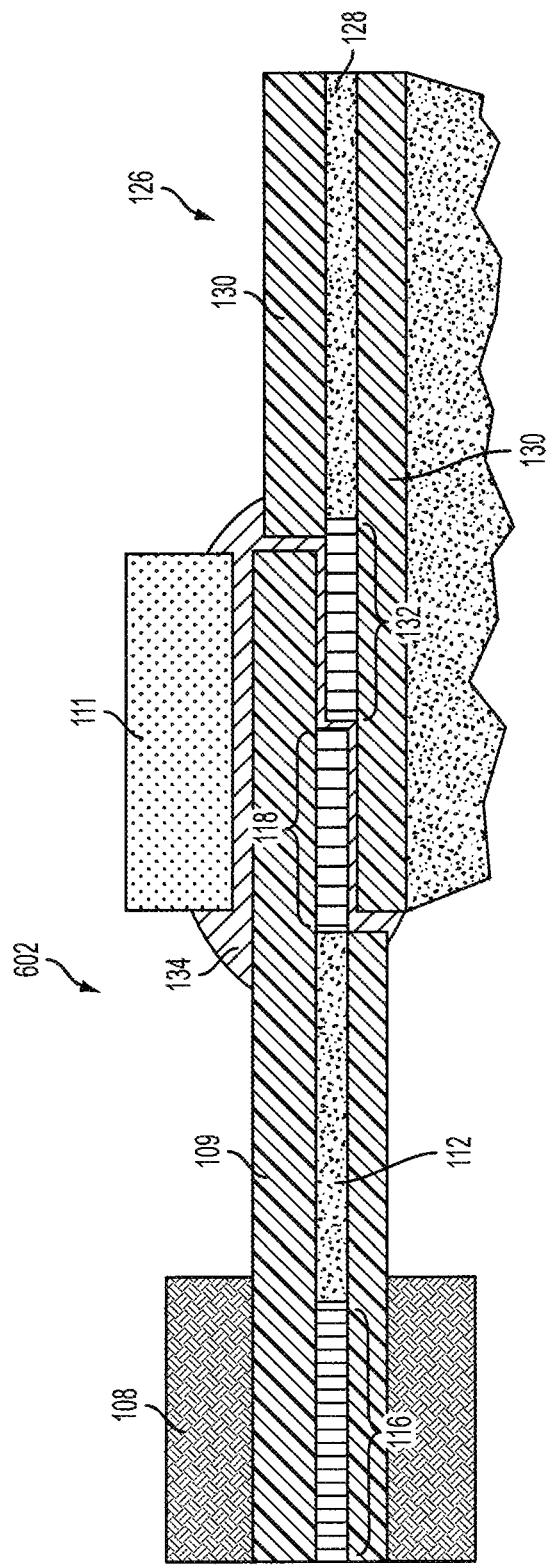
FIG. 6 illustrates an alternate exemplary embodiment of a flexible interface device.

FIG. 6 illustrates an alternate exemplary embodiment of a flexible interface device 602. The flexible interface device 602 is similar to the flexible interface device 102 (of FIG. 1) however, the flexible substrate portion 109 is butt-coupled with the single-mode waveguide portion 128 arranged on the wafer 126.

Figure 7:
FIGS. 7-13 illustrate side cut-away views of an exemplary method for fabricating an exemplary embodiment of the substrate portion. In this regard.

FIGS. 7-13 illustrate side cut-away views of an exemplary method for fabricating an exemplary embodiment of the substrate portion 109. In this regard, FIG. 7 illustrates a flexible substrate 702 that may include, for example, a polyimide, polysilane, polynorbornene, polyethylene, epoxy, acrylic resin, or a fluorinated derivative of a resin material.

Figure 8:
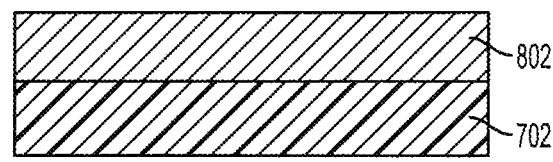

FIG. 8 illustrates a lower cladding layer 802 that is deposited on the flexible substrate 702 using, for example, a spin coating deposition process or another suitable deposition process. The lower cladding is made of a polymer material that is substantially transparent to the optical signals. For example, this includes a polyimide, polysilane, polynorbornene, polyethylene, epoxy, acrylic resin, or a fluorinated derivative of a resin material. The propagation loss of the cladding material is less than 20 dB/cm for the wavelength range of the optical signals or less than 3 dB/cm for a 60 nm wide wavelength spectrum located between 950 and 1650 nanometers (nm)).

Figure 9:
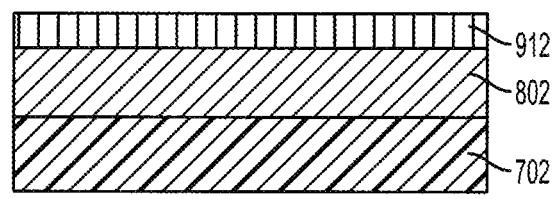

FIG. 9 illustrates a core material layer 912 that is deposited on the flexible substrate 702 using, for example, a spin coating deposition process or another suitable deposition process. The core material is made of a polymer material that is substantially transparent to the optical signals. For example, this includes a polyimide, polysilane, polynorbornene, polyethylene, epoxy, acrylic resin, or a fluorinated derivative of a resin material. The propagation loss of the core material is less than 10 dB/cm for the wavelength range of the optical signals or less than 2 dB/cm for a 60 nm wide wavelength spectrum located between 950 and 1650 nanometers (nm)).

Figure 10:
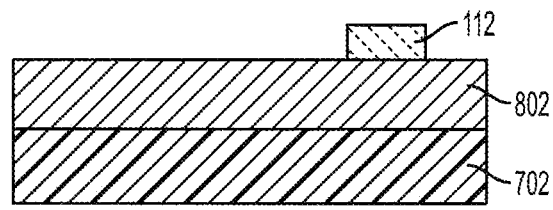

FIG. 10 illustrates the formation of the waveguide portion 112 by, for example, a photolithographic patterning process that removes portions of the core material layer 912 (of FIG. 9) to define the waveguide portion 112.

Figure 11:
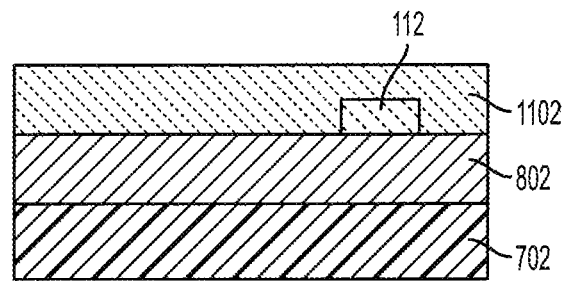

FIG. 11 illustrates the formation of an upper cladding layer 1102 over the exposed portions of the waveguide portion 112 and the lower cladding layer 802 using, for example, a spin coating deposition process or another suitable deposition process. The upper cladding layer 1102 may include the same, or a similar material as the lower cladding layer 802, or may include a different material.

Figure 12:
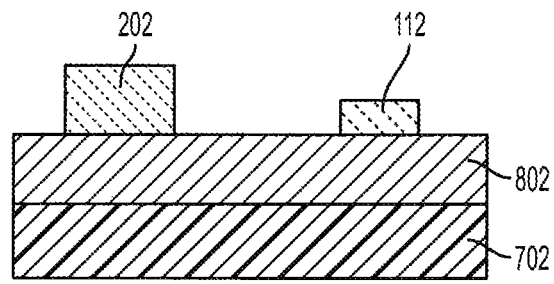

FIG. 12 illustrates the resultant structure following a photolithographic patterning process that removes portions of the upper cladding layer 1102 to define engagement features 202 (described above in FIG. 2).

Figure 13:
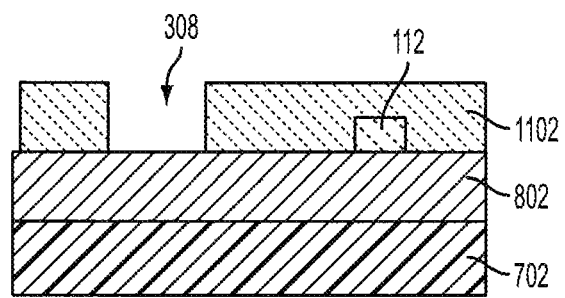

FIG. 13 illustrates the resultant structure following a photolithographic patterning process that removes portions of the upper cladding layer 1102 to define engagement features 308 (described above in FIG. 3). In the illustrated exemplary method, the engagement features 202 and 308 may be formed during the same photolithographic process such that the features shown in FIG. 12 and FIG. 13 may be formed substantially simultaneously in different regions of the substrate portion 109.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A fiber to wafer interface system comprising:
    an interface device comprising:
        a flexible substrate portion,
        a flexible cladding portion arranged on the substrate portion,
        a flexible single-mode waveguide portion arranged on the cladding portion including a substantially optically transparent material,
        a connector portion engaging a first distal end of the flexible substrate portion, the connector portion operative to engage a portion of an optical fiber ferrule, and
        an optical mode converter portion of the flexible single-mode waveguide portion at the second distal end of the flexible substrate portion; and
    a wafer portion comprising:
        a single mode waveguide portion arranged on a portion of the wafer,
        an optical mode converter portion of the single mode waveguide portion configured to couple to the optical mode converter portion of the flexible single-mode waveguide portion, and
    an adhesive configured to secure the interface device to the wafer portion.

2. The system of claim 1, wherein the adhesive is substantially optically transparent.

3. The system of claim 1, wherein the single mode waveguide portion of the interface device and the single mode waveguide portion of the wafer portion are arranged to define an optical coupling therein.

4. The system of claim 1, wherein the interface device further comprises an engagement feature operative to engage a corresponding engagement feature of the wafer.

5. The system of claim 4, wherein the engagement feature of the interface device extends from a surface of the flexible interface, and the engagement feature of the wafer includes a recess portion that engages the engagement feature of the flexible interface.

6. The system of claim 4, wherein the engagement feature of the wafer extends from a surface of the flexible interface, and the engagement feature of the interface device includes a recess portion that engages the engagement feature of the wafer.

7. The system of claim 1, wherein the substantially optically transparent material of the single-mode waveguide portion includes a polymer material.

8. The system of claim 1, wherein a pitch of the waveguide of the interface device at one distal end of the interface device is different than a pitch at an opposing distal end of the interface device.

9. The system of claim 1, wherein at least one optical fiber is disposed in proximally to a distal end of the interface device.

10. The system of claim 3, wherein at least one optical fiber is disposed in proximity to a distal end of the interface device.

11. The system of claim 10, wherein a number of optical fibers proximate to the interface device corresponds to a number of waveguides arranged on the interface device and a number of single-mode waveguides arranged on the wafer proximate to the interface device.

12. The system of claim 1, wherein the optical fiber ferrule includes an MT type ferrule.

13. The system of claim 1, wherein the flexible cladding portion includes a polymer material.

14. The system of claim 1, wherein the flexible substrate portion substantially transparent for wavelengths between approximately 350 nm and 400 nm.

* * * * *